A. SCHILLER.
MANUFACTURE OF GLOBULAR GLASS BOTTLES.
APPLICATION FILED AUG. 20, 1913.
1,080,372.
Patented Dec. 2, 1913.
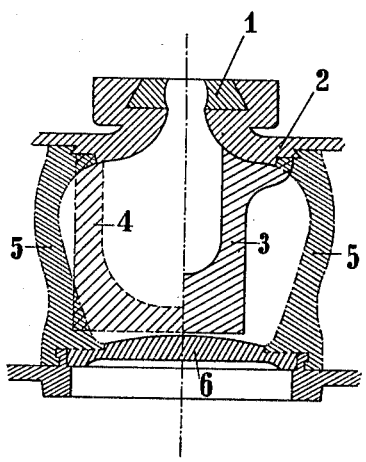
Witnesses:
N. P. Leonard.
E. C. Tate.
Inventor:
Adolf Schiller
by Attorneys
Byrnes Townsend & Brickenstein

UNITED STATES PATENT OFFICE.

ADOLF SCHILLER, OF SCHÖNEBERG, NEAR BERLIN, GERMANY.

MANUFACTURE OF GLOBULAR GLASS BOTTLES.

1,080,372.     Specification of Letters Patent.     Patented Dec. 2, 1913.

Application filed August 20, 1913. Serial No. 785,693.

*To all whom it may concern:*

Be it known that I, ADOLF SCHILLER, a citizen of the German Empire, residing at Schöneberg, near Berlin, Germany, have invented certain new and useful Improvements in and Relating to the Manufacture of Globular Glass Bottles, of which the following is a specification.

This invention relates to the manufacture of large globular bottles especially for carboys by machinery and aims at a uniform and adequate distribution of the glass throughout the whole body of the bottle. For this purpose the invention makes use of a plurality of molds used in succession where the hot glass is blown substantially without elongation preliminary to its final shaping within the finishing mold. In accordance with the invention the preliminary blowing mold or molds are so shaped that the glass is shaped therein in such a manner that the part of the glass wall adjacent the neck receives already in each of the preliminary blowing steps a section of the form which is desired for the final product. In this way it becomes possible to produce bottles which project largely in lateral direction in a part adjacent the neck of the bottle. It has heretofore proved unpracticable to manufacture such kind of bottles by machinery because the glass adjacent the bottle neck is cooled down by the contact with the wall of the metal mold to such a degree that it is not possible to obtain a uniform displacement of the glass contained in such parts of the bottle blanks, when the blanks are brought into molds which have cavities of such dimensions that the glass finds free space for lateral expansion therein. However as aforesaid it can practically not be suitably expanded laterally in consequence of its having been cooled down too much by contact with the metal mold wall. If, however, in accordance with this invention, there are used in connection with a mold interiorly shaped to give final form to the bottle, a preliminary blowing mold or molds, each of which is shaped at its top to uncover a portion or portions of the upper wall-forming mold surface of the main mold, then that portion of the glass of the upper wall of the bottle, as produced by the use of one of the preliminary blowing molds needs no further displacement on its being introduced into a wider preliminary mold or into the finishing mold, so that no opportunity is given to deteriorate the product by reason of the glass in the upper wall of the bottle being too much cooled down during the blowing process in a preliminary mold.

A mold system adapted to be used for carrying out the invention is shown by way of example in the accompanying drawing.

The drawing only shows the several sets of blowing molds to be used in succession during the blowing of a glass blank into the final shape of a big globular bottle, whereas the mold which serves for receiving the molten glass to be poured therein has not been shown on the drawing. It is, however, assumed that an inverted mold is used preliminary to the mold system illustrated on the drawing into which the molten glass is poured and from which it is removed by transporting a neck mold to the new blowing mold system. On the drawing such neck mold is designated with the numeral 1. This neck mold is inserted into an upper mold 2 being shaped in accordance with the desired shape of the final globular glass bottle.

Two preliminary molds 3 and 4 adapted to be lowered down are provided for blowing the blank previously to the finishing blowing in the finishing mold 5. The two preliminary blowing molds 3 and 4 are each illustrated on the drawing in a half of the mold only, the half of mold 3 being shown in full lines on the right hand of the figure and the half of mold 4 in dotted lines on the left side of the figure. Means for lowering and raising said molds 3 and 4 are not illustrated because any suitable means may be used for this purpose as is obvious to experts and because no claim is laid on such lowering and raising means for said molds.

6 is the bottom of the finishing mold 5 which is adapted to be removed so as to give free passage to the molds 3 and 4. The finishing mold 5 is supposed to be adapted to be opened so as to allow preliminary blowing molds 3 and 4 to be brought into their upper operative position.

The use of the mold system illustrated on the drawing is as follows: Assume that a suitable quantity of glass has been poured into an inverted preliminary mold connected at its lower end with the neck mold 1 so that the cavity of the neck mold is filled with the glass in the usual manner and that the glass blank formed in this way has been transported to the mold system illustrated on the drawing after withdrawal of the neck mold 1 from said inverted preliminary mold. If now the first preliminary blowing mold 3 is raised the glass blank suspended in neck mold 1 is included by the cavity of said first preliminary blowing mold 3. If, now, the blank is blown out in this first preliminary mold, it is shaped in accordance with the contours produced by the exposed portion of the upper wall of the upper mold 2 and the inner walls of the first preliminary mold 3, that portion of the upper wall of the bottle adjacent the neck being given its final form. If, now, the first preliminary mold 3 is lowered and thereafter the second preliminary blowing mold 4 raised into contact with the upper mold 2, a still further portion of the upper wall-forming surface of the upper mold 2 is uncovered, and when the blowing process is repeated the blank is laterally expanded and at the same time to some extent elongated, and an additional portion of the upper wall of the bottle receives its final shape, as appears clearly from the drawing, so that on further blowing the blank in the final mold 5 after lowering mold 4 and closing said final mold 5 the bottle wall adjacent the bottle neck needs not to be displaced by the blowing process in order to come into contact with the wall of the finishing mold. It is on the contrary only necessary to displace the glass in those parts of the bottle blank which are more remote from the bottle neck and which remain in a softer condition than those parts of the wall which are nearer the bottle neck. Therefore a uniform distribution of the glass in the finished bottle can easily be obtained by using a mold system as above described.

What I claim is:

1. In the manufacture of glass bottles with a bulging body and narrow neck, the process which consists in blowing the glass in successive steps, in each of which steps successive portions of the laterally projecting upper wall of the bottle are given their final shape.

2. A glass mold having an upper blowing mold portion shaped to form the laterally projecting upper wall of a bottle with a bulging body and narrow neck, a lower body mold portion shaped to give with the upper mold portion final shape to the bottle, and having a removable bottom-closure and a series of detachable closed bottom preliminary blowing-mold portions shaped to expose successive portions of the upper wall molding-surface of the upper mold portion.

In testimony whereof I affix my signature in presence of two witnesses.

ADOLF SCHILLER.

Witnesses:
 HENRY HASPER,
 WOLDEMAR HAUPT.

---

Copies of this patent may be obtained for five cents each, by addressing the "Commissioner of Patents, Washington, D. C."